UNITED STATES PATENT OFFICE.

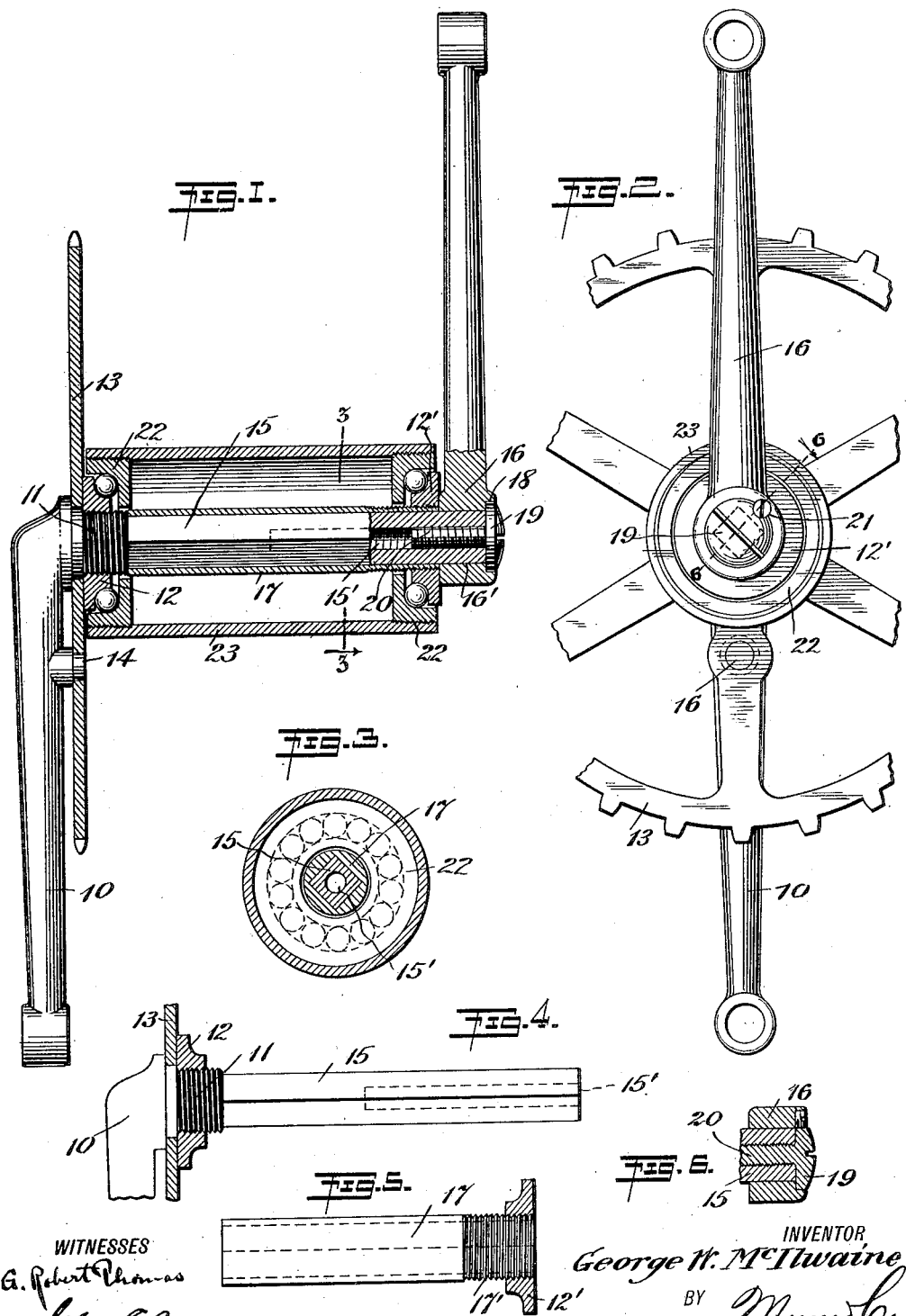

GEORGE W. McILWAINE, OF RUTHERFORD, NEW JERSEY.

BICYCLE CRANK-HANGER.

1,104,523.    Specification of Letters Patent.    Patented July 21, 1914.

Application filed February 2, 1914. Serial No. 816,056.

*To all whom it may concern:*

Be it known that I, GEORGE W. McILWAINE, a citizen of the United States, and a resident of Rutherford, in the county of Bergen and State of New Jersey, have invented a new and Improved Bicycle Crank-Hanger, of which the following is a full, clear, and exact description.

This invention relates to bicycle construction and has particular reference to hangers.

Among the objects of the invention is to provide a hanger of peculiar and novel construction adapted especially for repair purposes, although it may be used in connection with new devices.

A further object of the invention is to provide a hanger of a simple, strong, durable and reliable nature, and one which is well adapted to be applied to various sizes or makes of bicycle brackets without reconstruction except to cut off certain of the parts according to the required length.

The foregoing and other objects of the invention will hereinafter be more fully described and claimed and illustrated in the drawings forming a part of this specification in which like characters of reference indicate corresponding parts in all the views, and in which—

Figure 1 is a vertical longitudinal section through a bracket and indicating my improvement in operative position; Fig. 2 is a side elevation of the same looking toward the left in Fig. 1; Fig. 3 is a vertical transverse section on the line 3—3 of Fig. 1; Fig. 4 is a view of the right crank and shaft integral therewith; Fig. 5 is a view of the sleeve adapted to be fitted to the shaft; and Fig. 6 is a detail sectional view on the line 6—6 of Fig. 2.

The several parts of the device may be made of any suitable materials, and the relative sizes and proportions, as well as the general design of the mechanism, may be varied to a certain extent without departing from the spirit of the invention hereinafter more fully set forth and specifically claimed.

At 10 I show a right crank having a shoulder 11 with a right hand thread upon which is screwed a cone 12 acting as a nut to hold the sprocket wheel 13 adjacent the crank. The wheel of the bicycle is positively prevented from rotation independently of the crank by means of a stud 14.

The above mentioned parts are or may be of any well known construction. A shaft 15, however, preferably made integral with the crank 10, is of polygonal form preferably beyond the threaded shoulder 11. Among the reasons for this form is to simplify the construction and to facilitate the fitting thereon of the left crank 16 having a socket 16' of the same form as the exterior surface of the shaft.

At 17 I show a sleeve which may be of cylindrical form on its outer surface for convenience of construction, and having a polygonal bore whereby it may be slipped readily upon the polygonal shaft 15. The right hand end of the sleeve is preferably smooth and is adapted to be cut off by a hack saw or otherwise, so as to fit snugly against the shoulder 11, leaving the left hand end of the sleeve spaced just far enough from the extreme left hand end of the shaft to receive the left crank 16 thereof and abutting against the end of the sleeve, as shown in Fig. 1.

The left crank is provided with a countersink 18 into which the head 19 of a screw 20 is seated, said screw coöperating with a threaded opening 15' on the shaft. The opening 15' just referred to is formed deep enough to allow any necessary part of the left hand end of the shaft to be cut off for the purpose of fitting it to any special form of bracket to be fitted. The screw 20 may be locked in position by means of a screw threaded plug 21 coöperating between the head 19 of the screw and the hub of the left crank 16, as shown in Figs. 2 and 6. The left hand end of the sleeve 17 is provided with a left hand thread 17' long enough to accommodate a cone 12'. The cones 12 and 12' coöperate with cups 22 carried by the ends of the bracket 23 in the usual manner.

It will be observed that the means above described makes it possible and easy to fit a new repair hanger to any old or known form of bicycle bracket, the shaft 15 and sleeve 17 being easily cut off to the required length and all the other fittings being easily made thereafter. The sleeve, in addition to providing a seat for the left hand cone 12' and a back for the left crank, constitutes a stiffener or reinforcement for the shaft, obviating any possibility of twisting or straining the shaft. The polygonal connection between the left crank and the shaft further insures a positive means for maintaining the cranks in proper alinement. The terms "right" and "left" as used herein are to be understood as applying to the bicycle construction rather than to the drawings hereto attached.

Having thus described my invention, I claim as new and desire to secure by Letters Patent:—

1. The herein described crank hanger comprising, in combination, a crank having a threaded shoulder and a polygonal shaft extending laterally therefrom, a sleeve having a polygonal bore fitted to said shaft and abutting against said shoulder, the end of the sleeve opposite the shoulder being screw threaded and spaced inwardly from the extreme end of the shaft, a second crank having a polygonal socket fitted to the end of the shaft and abutting against the threaded end of the sleeve, means to prevent separation of the last mentioned crank from the shaft, and bearing members fitted to the threaded portions of the crank and sleeve.

2. In a device of the character set forth, the combination with a bicycle bracket including bearing members secured to its ends, of a crank hanger comprising a crank having a threaded shoulder and a polygonal shaft extending laterally therefrom through the bracket, a bearing member secured on said threaded shoulder and coöperating with one of the bracket bearing members, a sleeve fitted to the shaft within the bracket, said sleeve abutting at one end against said threaded shoulder and having its opposite end provided with a screw thread of opposite character from that of the shoulder, a bearing member secured to the threaded end of the sleeve and coöperating with the remaining bearing member of the bracket, a crank fitted to the laterally projecting end of the shaft and abutting against the threaded end of the sleeve, and means extending into the shaft serving to prevent outward displacement of the last mentioned crank therefrom.

3. In a bicycle hanger, the combination of a crank having an integral polygonal shaft extending therefrom, the outer end of the shaft being adapted to be cut off to provide any desired length for the shaft, the free end of the shaft being internally bored and tapped, a stiffening and reinforcing member fitted to the exterior surface of said shaft and being of variable length in accordance with the desired length of the shaft, the outer end of the member being spaced from the extreme end of the shaft, a second crank fitted to the projecting end of the shaft and abutting against the adjacent end of the reinforcing member, and a screw acting against the last mentioned crank and extending into the tapped bore of the shaft to secure the crank to the shaft.

In testimony whereof I have signed my name to this specification in the presence of two subscribing witnesses.

GEORGE W. McILWAINE.

Witnesses:
WILLIAM J. PUGH,
VALENTINE H. GEROLSTEIN, Jr.

---

Copies of this patent may be obtained for five cents each, by addressing the "Commissioner of Patents, Washington, D. C."